3,281,362
WAX-COATED MOLYBDENUM DISULFIDE
Alfred J. Di Sapio, Greenwich, Conn., assignor, by mesne assignments, to Dow Corning Corporation, Midland, Mich., a corporation of Michigan
No Drawing. Filed Jan. 25, 1963, Ser. No. 253,979
5 Claims. (Cl. 252—25)

This invention relates to a novel composition capable of forming films having remarkable resistance to the penetration of moisture and also providing excellent lubrication durability.

In a preferred embodiment of this invention, the composition consists essentially of minute molybdenum disulfide particles with a partially absorbed coating of approximately 2 to 15 percent by weight of wax. This composition may conveniently be prepared by dissolving the wax component in a suitable inert solvent, adding powdered molybdenum- disulfide thereto, mixing well and then evaporating the solvent to repowder the molybdenum disulfide in the form of minute particles coated with the wax.

In another embodiment, the composition is dissolved or suspended in a liquid carrier, preferably an inert solvent for the wax component. Such a composition may readily be prepared in the manner previously described, the inert liquid however being either incompletely evaporated or, if completely evaporated, the repowdered composition being redissolved or suspended in the same or a different solvent or vehicle.

The wax may be any suitable wax having a melting point below about 65° C. and desirably having fair to good lubricating properties. Beeswax has been found to be optimum. Other waxes that are suitable are bayberry wax, oxogerite and spermaceti wax.

The choice of solvent for the wax depends primarily on the particular wax that is chosen and is preferably one that has a reasonably low boiling point, e.g., approximately 120° C. or less. The solvents that have been found most suitable thus far are hydrocarbon solvents such as benzene, toluene and naphtha.

The means employed to repowder the composition may vary greatly and depend largely on the equipment that is available and the amounts that are involved. Thus, for example, one suitable method is that of spraying a solution or suspension of molybdenum disulfide and wax, after intimate mixing, into a spray chamber in which the solvent evaporates and minute particles of molybdenum disulfide coated with wax fall to the bottom for collection.

The composition of the invention may readily be applied to various surfaces generally, and metal surfaces particularly, by any one of several means, especially by spraying followed, if desired, by burnishing. One very effective manner of application is by spraying with an aerosol type propellent. Another is by spraying with an ordinary spray gun. It is also within the scope of the invention to apply the composition by applying a solution or suspension thereof in an inert vehicle, which may be the original solvent, and allowing the vehicle to evaporate after application to the surface. If desired, the composition, after application to a surface, is suitably burnished or rubbed so as to induce sufficient flow in the wax portion of the composition to provide a uniform coating on the surface to which it has been applied.

The film that is thus applied to a bearing or metal surface is a non-porous, adherent film that is impervious to moisture and can readily be built up into a fairly thick film to provide excellent corrosion inhibiting properties as well as lubricating properties with resulting wear-life improvement. The heat and pressure encountered in bearing surfaces is sufficient to cause a film of the composition of this invention to heal itself completely if it should be ruptured or nonuniformly applied.

It is to be understood that other materials can be added to the composition of this invention. Thus, for example, it may be suitable to add a fractional amount, e.g., about 0.1 to 1 percent, of an alkaline corrosion inhibitor such as sodium nitrite or sodium silicate, which buffers the acidity of the molybdenum disulfide and the wax, thereby further enhancing the corrosion inhibiting properties of the composition.

Example 1

Two cold rolled steel plates were coated, one with a composition of the invention containing 2.5 percent beeswax and 97.5 percent molybdenum disulfide in the form of a dry powder burnished on to the surface of the plate, the other being treated with untreated molybdenum disulfide powder likewise burnished on to the plate. The two plates were exposed to at atmosphere of 100 percent relative humidity at room temperature for one month.

The plate treated with the molybdenum disulfide-beeswax composition showed practically no corrosion, only a few small spots on the edges being affected. The other plate was completely corroded on the surface after only a few days.

Example 2

A number of competitive spray coatings and a spray coating of molybdenum disulfide-beeswax containing 7.5 percent beeswax were applied to a group of test bearing races which were then subjected to wear-life tests by gradually increasing the load on a block, having a Rockwell hardness of $R_c$ 30, in line contact with the bearing race under identical conditions. The results, in terms of linear feet of travel before failure, are given in the table immediately below:

| | Feet |
|---|---|
| A | 62 |
| B | 79 |
| C | 89 |
| D | 92 |
| E | 95 |
| F | 131 |
| G | 120 |
| $MoS_2$/wax | 14,500+ |

Example 3

Powdered molybdenum disulfide coated with varying percentages by weight of beeswax was coated on hardened steel pins having a diameter of 0.751 inch by rubbing the powder thereon and tested to determine coefficients of dynamic friction by press fit tests which involved jamming the steel pins into a hardened steel bushing having an inside diameter of 0.7500 inch and measuring the force required.

The results were as follows:

| Percent beeswax: | Coefficient of friction |
|---|---|
| 0 (standard) | .03–.06 |
| 2.5 | .04–.056 |
| 5 | .04 |
| 7.5 | .04 |
| 10 | .047–.051 |
| 15 | .07 |

It was noted that the wear life of the standard specimen (coated with 100 percent $MoS_2$) was considerably less than for the other specimens, that the adhesion of the coating thereon was noticeably poorer, and that the bearing surface thereof was much more susceptible to corrosion than the others.

I claim:
1. A composition of matter consisting essentially of minute, discrete particles of molybdenum disulfide coated with a wax having a melting point below about 65° C.
2. A composition of matter consisting essentially of minute, discrete particles of molybdenum disulfide coated with a wax of the group consisting of beeswax, bayberry wax, ozokerite and spermaceti wax.
3. A composition of matter consisting essentially of minute, discrete particles of molybdenum disulfide coated with beeswax.
4. A composition of matter consisting essentially of minute, discrete particles of molybdenum disulfide and 2 to 15 percent by weight, based on the weight of molybdenum disulfide, of a wax of the group consisting of beeswax, bayberry wax, ozokerite and spermaceti wax in an inert hydrocarbon solvent.
5. A composition of matter consisting essentially of minute, discrete particles of molybdenum disulfide coated with 2 to 15 percent by weight of a wax of the group consisting of beeswax, bayberry wax, ozokerite and spermaceti wax.

References Cited by the Examiner

UNITED STATES PATENTS

| 280,134 | 6/1883 | Colgan | 252—12 |
| 1,735,368 | 11/1929 | Williams | 252—12 |
| 2,588,234 | 3/1952 | Henricks | 252—25 |
| 2,686,156 | 8/1954 | Arntzen et al. | 252—25 |

OTHER REFERENCES

Vineall et al., "Molybdenum Disulphide" in Scientific Lubrication, April 1959, pages 32–35.

DANIEL E. WYMAN, *Primary Examiner.*

R. E. HUTZ, E. W. GOLDSTEIN, P. P. GARVIN,
*Assistant Examiners.*